(12) United States Patent
Odessky et al.

(10) Patent No.: US 6,354,337 B1
(45) Date of Patent: Mar. 12, 2002

(54) OVEN BASTER AND CLEANING BRUSH

(75) Inventors: Bruce Odessky, Vernon Hills; Shane Peterson, Barrington; Alison A. Roach, Schaumburg, all of IL (US)

(73) Assignee: The Pampered Chef, Ltd., Addison, IL (US)

( * ) Notice: Subject to any disclaimer, the term of this patent is extended or adjusted under 35 U.S.C. 154(b) by 0 days.

(21) Appl. No.: 09/649,212

(22) Filed: Aug. 28, 2000

(51) Int. Cl.[7] ................................................ B65B 1/04
(52) U.S. Cl. .............................. 141/26; 141/98; 99/345; 15/104.2
(58) Field of Search ...................... 141/26, 98; 99/345; 15/104.03, 104.05, 104.16, 104.2, 164, 206

(56) References Cited

U.S. PATENT DOCUMENTS

| | | | | |
|---|---|---|---|---|
| 5,339,480 A | * | 8/1994 | Murg et al. | 15/106 |
| 5,615,439 A | * | 4/1997 | Bourrelly | 15/104.2 |
| 5,787,799 A | * | 8/1998 | Mohrhauser et al. | 99/345 |
| D408,106 S | * | 4/1999 | Cousins et al. | 15/164 |

* cited by examiner

*Primary Examiner*—Steven O. Douglas
(74) *Attorney, Agent, or Firm*—Olson & Hierl, Ltd.

(57) ABSTRACT

A baster and cleaning brush set includes a baster and a cleaning brush. The baster has a tube with a tip portion at one end and a compressible bulb at the other end. The bulb is removable from the tube. The cleaning brush includes a handle and a shank from which bristles extend transversely. An elongate cleaning probe, sized to fit within the tip portion, extends from the end of the handle opposite the shank and bristles.

21 Claims, 6 Drawing Sheets

OVEN BASTER AND CLEANING BRUSH

TECHNICAL FIELD OF THE INVENTION

This invention relates to cooking utensils, namely oven basters, and more particularly to an oven baster and a cleaning brush therefor.

BACKGROUND OF THE INVENTION

A cooking utensil that is useful in the kitchen is the oven baster. Such a utensil is used to apply liquids to foods, typically meat or poultry, that are being baked or roasted in an oven. The liquid is applied periodically during cooking to prevent excessive drying of the food or to add flavorings. Typically, prior oven basters have included a tube of relatively large diameter having a tip portion of reduced diameter at one end and a compressible, self-expanding bulb at the other end. With the bulb compressed, the tip portion is placed in a reservoir of basting fluid. Pressure on the bulb is then released, allowing the bulb to self-expand and draw fluid into the tube. By positioning the tip portion over the food to be basted and again compressing the bulb, the fluid is expelled from the tube through the tip portion and onto the food.

The liquids that are typically dispensed using an oven baster often include solid particles or other substances that adhere to the interior surface of the basting tube, or that are large enough to become lodged in the tip portion of the tube. It is necessary to clean the interior of the tube after use. This can be accomplished by disassembling the tube and bulb and using a bottle-type brush to clean the interior of the basting tube. Such brushes, if sized for the relatively large diameter of the reservoir portion of the tube, are too large to fit within the smaller diameter tip portion. Either the tip portion must be cleaned with water and determent alone, or some other utensil of small diameter must be used to clean or dislodge matter from the tip portion, which is inconvenient at best.

It would be desirable to provide a cleaning brush for an oven baster that alleviates the difficulty of cleaning the small diameter tip portion portion of the basting tube.

Prior oven basters have employed tubes constructed of various materials, such as metal, glass and opaque or translucent plastic. Glass and metal are resistant to heat deformation. Glass also has the advantage of being transparent, which favors inspection and measurement of basting fluid within the tube, and also verifying cleanliness of the interior of the tube. Glass is quite easily broken during storage or use, however. Opaque or translucent plastic is resistant to breakage, but is not as heat resistant as glass and does not have the advantages of transparency.

It would be desirable to provide an oven baster having a tube that is transparent, resistant to breakage, and resistant to heat.

These and other advantages are provided by the present invention.

SUMMARY OF THE INVENTION

The present invention, according to one aspect, includes a baster having a tube with a tip portion and a reservoir portion. The tube is comprised of a substantially transparent polymeric material. A compressible bulb is in communication with the reservoir portion of the tube. The bulb is resiliently self-expandable to induce reduced air pressure in the tube relative to ambient air pressure.

According to another aspect of the present invention, a cleaning brush for a tube includes a handle having a proximate end and a distal end. A longitudinal shank extends distally from the distal end of the handle, and plurality of bristles extend substantially transversely from the shank. An elongate cleaning probe extends distally from the distal end of the handle.

According to yet another aspect of the present invention, a baster and cleaning brush set is provided. Included is a baster having a tube with a reservoir portion and a tip portion, and a compressible bulb in communication with the reservoir portion of the tube. The bulb is resiliently self-expandable to induce reduced air pressure in the tube relative to ambient air pressure. Also included is a cleaning brush for the tube having a handle with a proximate end and a distal end. A longitudinal shank extends distally from the distal end of the handle. A plurality of bristles extend substantially transversely from the shank. An elongate cleaning probe extends distally from the distal end of the handle.

Other features and advantages of the present invention will be apparent from the following descriptions of a preferred embodiment, made with reference to the drawings.

DESCRIPTION OF THE PREFERRED EMBODIMENT

Referring to FIGS. 1–4, there is illustrated an oven baster 10 in accordance with the present invention having two principal components, a tube 12 and a bulb 14. Tube 12 is generally elongate, hollow, and symmetrical about a longitudinal axis, and includes a reservoir portion 16, a transition segment 18, and a tip portion 20. Reservoir portion 16 includes a first open end 22 and a second end 24 and is tapered substantially linearly therebetween, with first end 22 having a diameter larger than the diameter of second end 24.

Transition segment 18 extends integrally from second end 24 of reservoir portion 16 and undergoes a non-linear, i.e., curved, reduction in diameter between a first end 26, connected to second end 24 of reservoir portion 16, and a second end 28.

Tip portion 20 extends integrally from second end 24 of transition segment 18 and is tapered substantially linearly between a first end 30, connected to second end 28 of transition segment 18, and a second, open end 32. First end 30 of tip portion 20 has a diameter substantially equal to the diameter of second end 28 of transition segment 18 and larger than the diameter of open second end 32. Reservoir portion 16, transition segment 18 and tip portion 20 together define an interior, elongate passage in continuous communication from open end 22 of reservoir portion 16 to open end 32 of tip portion 20.

Spaced from open end 22 of tube 12 is an annular stop 34 extending radially outwardly from reservoir portion 16 and having a diameter larger than the diameter of reservoir portion 16 adjacent thereto. Spaced between open end 22 of tube 12 and annular stop 34 is an annular sealing ring 36 extending radially outwardly from reservoir portion 16 and having a diameter larger than the diameter of reservoir portion 16 adjacent thereto, but smaller than the outer diameter of annular stop 34. Sealing ring 36 and annular stop 34 cooperate with bulb 14 as described further below.

Disposed along the length of reservoir portion 16 are two series of indicia marking the cumulative volume of the internal passage defined by tube 12 as measured from tip portion 20 toward open end 22. One series of indicia 38 (see FIG. 1) is located along one side of tube 12 and is marked in English units of measurement, i.e., in units of fluid ounces and fractions thereof. Another series of indicia 40 (see FIG. 2) is located along another side of tube 12 opposite the first series of indicia 38 and is marked in metric units of measurement, i.e., in units of milliliters. Both series of indicia 38 and 40 are integrally molded into the material of which tube 12 is constructed and are therefore substantially permanent, being highly resistant to being removed by wear or repeated washing.

Tube 12 is preferably constructed of a transparent polymeric material that is substantially rigid, resistant to breakage, resistant to acids that may be encountered in certain foods, and resistant to high temperatures on the order of those encountered in a dishwasher or from hot basting fluids which may be at the boiling point of water (100° C.) or higher. The transparency of tube 12 permits ready inspection of fluids drawn into reservoir portion 16 and facilitates measurement of the volume of fluid so drawn because the location of the air-to-fluid meniscus is easily located and compared to the nearest indicia 38 or 40. Preferably, the material of which tube 12 is constructed is Lexan® 204 polycarbonate resin which is resistant to heat deformation at a temperature of 100° C., and up to about 118° C. So constructed, tube 12 enjoys the advantages of prior art glass basting tubes with respect to transparency and resistance to heat and acid, and also enjoys the advantage of prior art opaque plastic basting tubes with respect to resistance to breakage.

Again referring to FIGS. 1–4, bulb 14 is shown assembled to tube 12 in FIG. 1, and shown disassembled therefrom in FIGS. 2 and 4. Bulb 14 is preferably constructed of a flexible, resilient elastomeric material, and is hollow, compressible and self-expandable. Preferably, bulb 14 is constructed of Santoprene® 271-55 thermoplastic elastomer. To facilitate complete cleaning, tube 12 and bulb 14 preferably should be disassembled. Disassembly and reassembly is facilitated by the flexible, resilient nature of the material from which bulb 14 is constructed. Bulb 14 includes a bulbous portion 42 and a neck portion 44 of reduced diameter defining an opening 45. The bulbous portion 42 is significantly greater in diameter than reservoir portion 16 of tube 12, whereas opening 45 of neck portion 44 has an internal diameter slightly smaller than the external diameter of open end 22 of tube 12, when disassembled therefrom. Consequently, when bulb 14 is assembled to tube 12, neck portion 44 stretches slightly in a flexible and resilient manner to overlie that portion of tube 12 adjacent open end 22 to effect a tight seal between bulb 14 and tube 12. When so assembled, the interior passage of tube 12 is in communication with the hollow interior of bulb 14. The seal is further assured, and retention of bulb 14 on tube 12 is facilitated, by the interaction of bulb 14 and sealing ring 36 of tube 12. More particularly, neck portion 44 of bulb 14 includes an inner annular groove 46 formed in the bulb wall 48 (see FIG. 4) that receives sealing ring 36 when bulb 14 is assembled to tube 12. The annular end 50 (see FIG. 4) of neck portion 44 abuts annular stop 34 of tube 12. Bulb 14 is thereby prevented from sliding too far onto tube 12, and the alignment of sealing ring 36 and annular groove 46 is facilitated.

The resiliently self-expandable characteristic of bulb 14 permits bulb 14 to be squeezed and compressed, such as between a thumb and forefinger, while assembled to tube 12. Subsequent relaxation of squeezing pressure permits bulb 14 to self-expand to its original configuration, thereby inducing reduced air pressure in tube 12 relative to ambient air pressure. In this manner, fluids can be sucked or drawn up into reservoir portion 16 of tube 12 through open end 32 of tip portion 20. Subsequently, the fluids so drawn can be expelled through open end 32 of tip portion 20 by again compressing bulb 14, thereby inducing increased air pressure in tube 12 above the fluids, relative to ambient air pressure.

Figure 1:
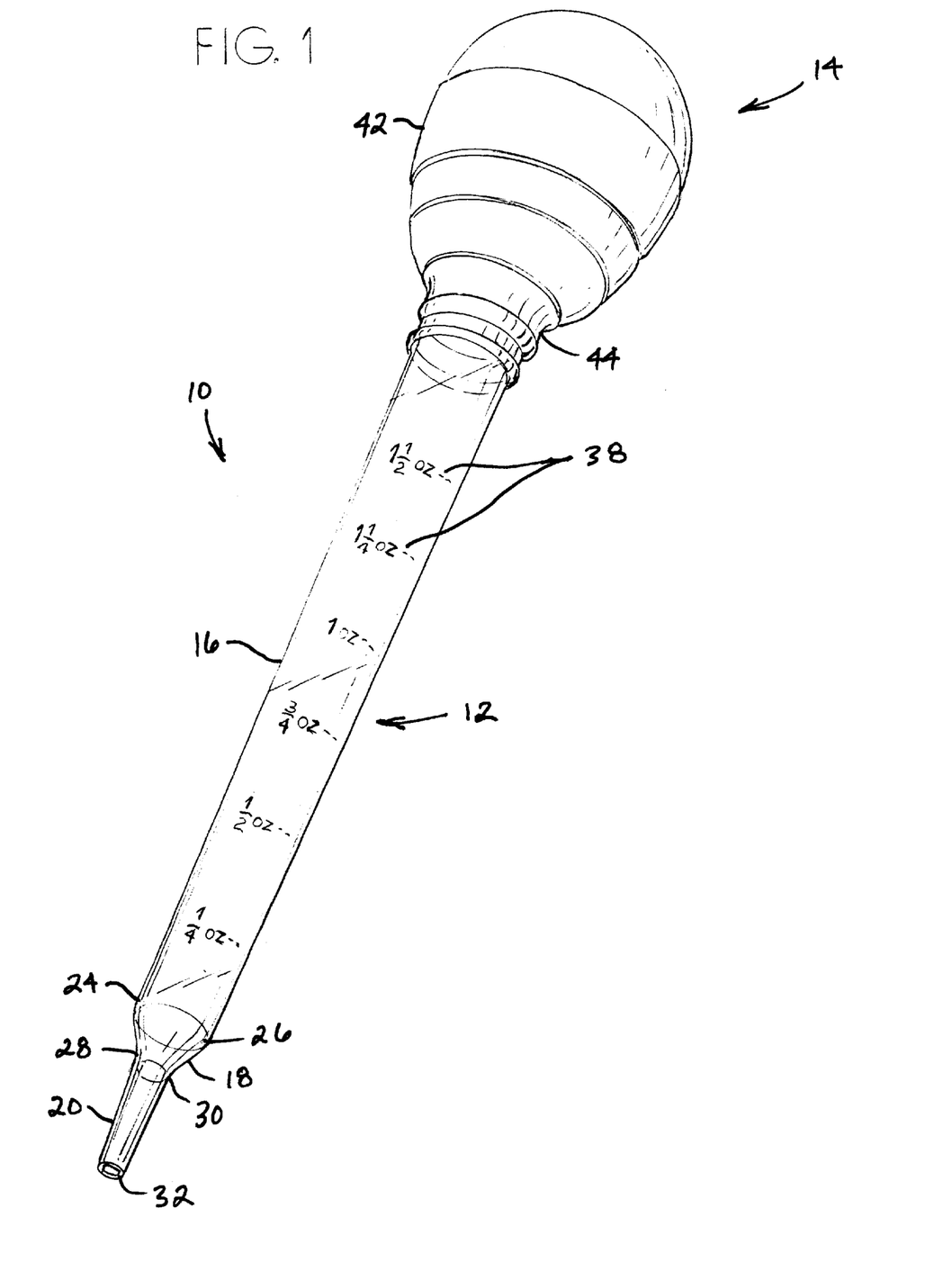
FIG. 1 is a perspective view of an oven baster in accordance with the present invention, the bulb and tube being assembled.
Figure 2:
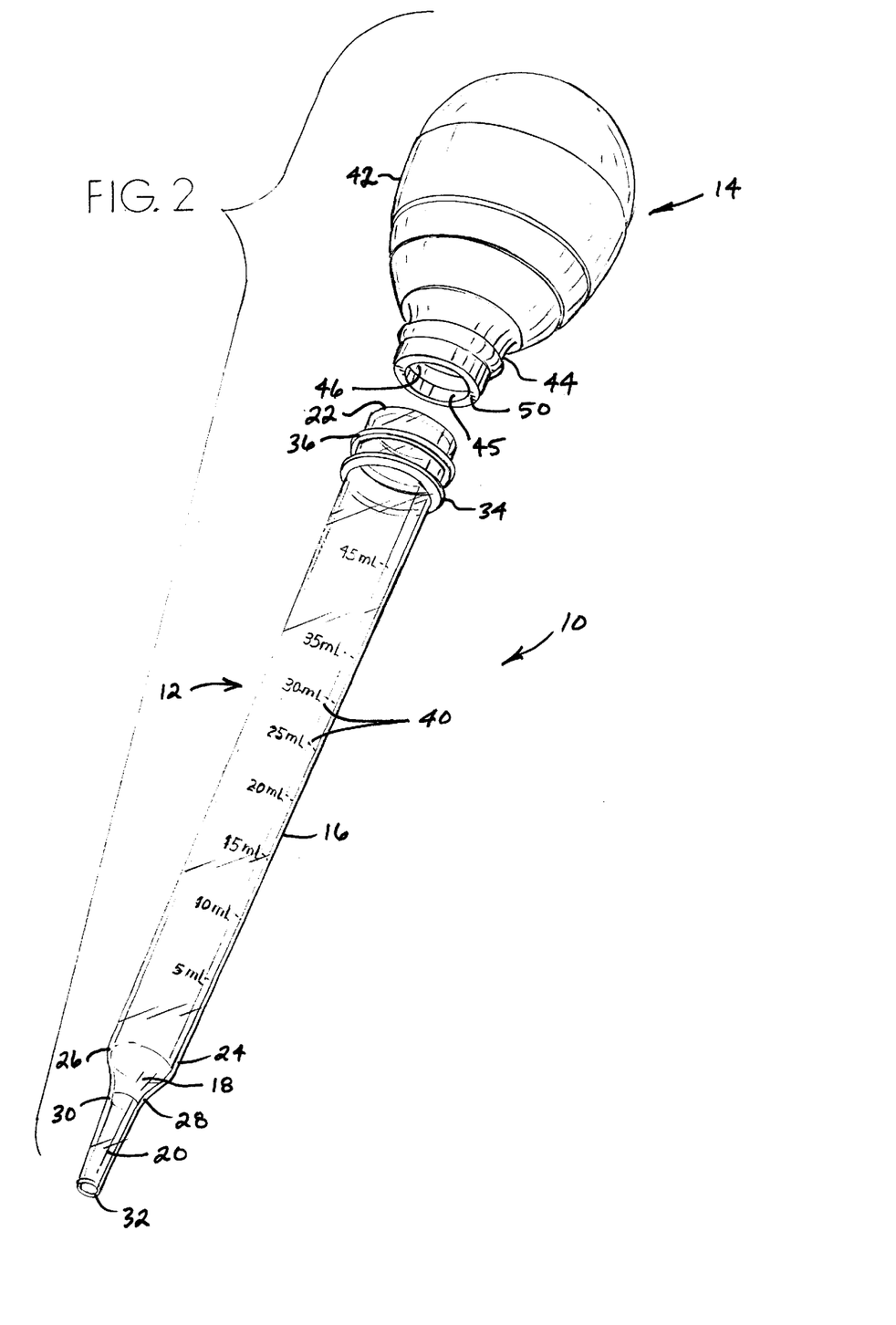
FIG. 2 is a perspective view of the oven baster of FIG. 1, the bulb and tube being disassembled.
Figure 3:
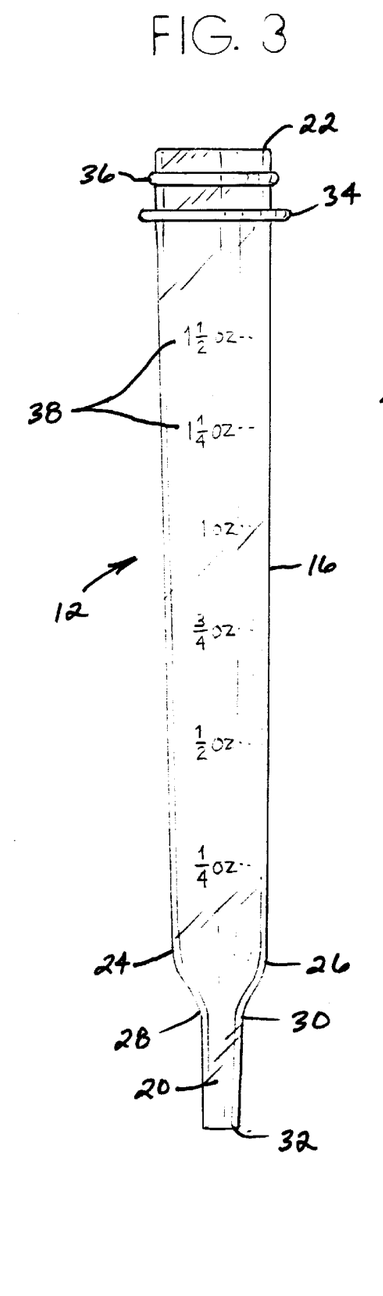
FIG. 3 is an elevational view of the tube of the oven baster of FIG. 1.
Figure 4:
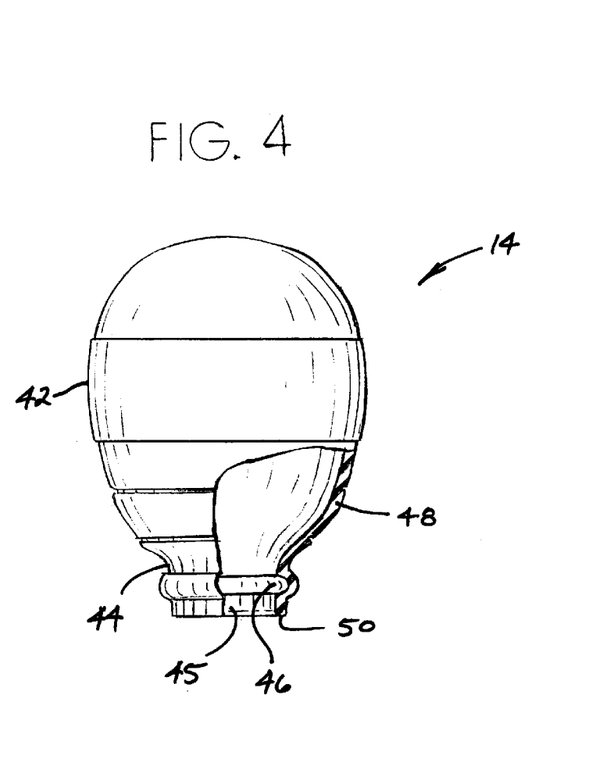
FIG. 4 is an elevational view, partially in section, of the bulb of the oven baster of FIG. 1.
Figure 5:
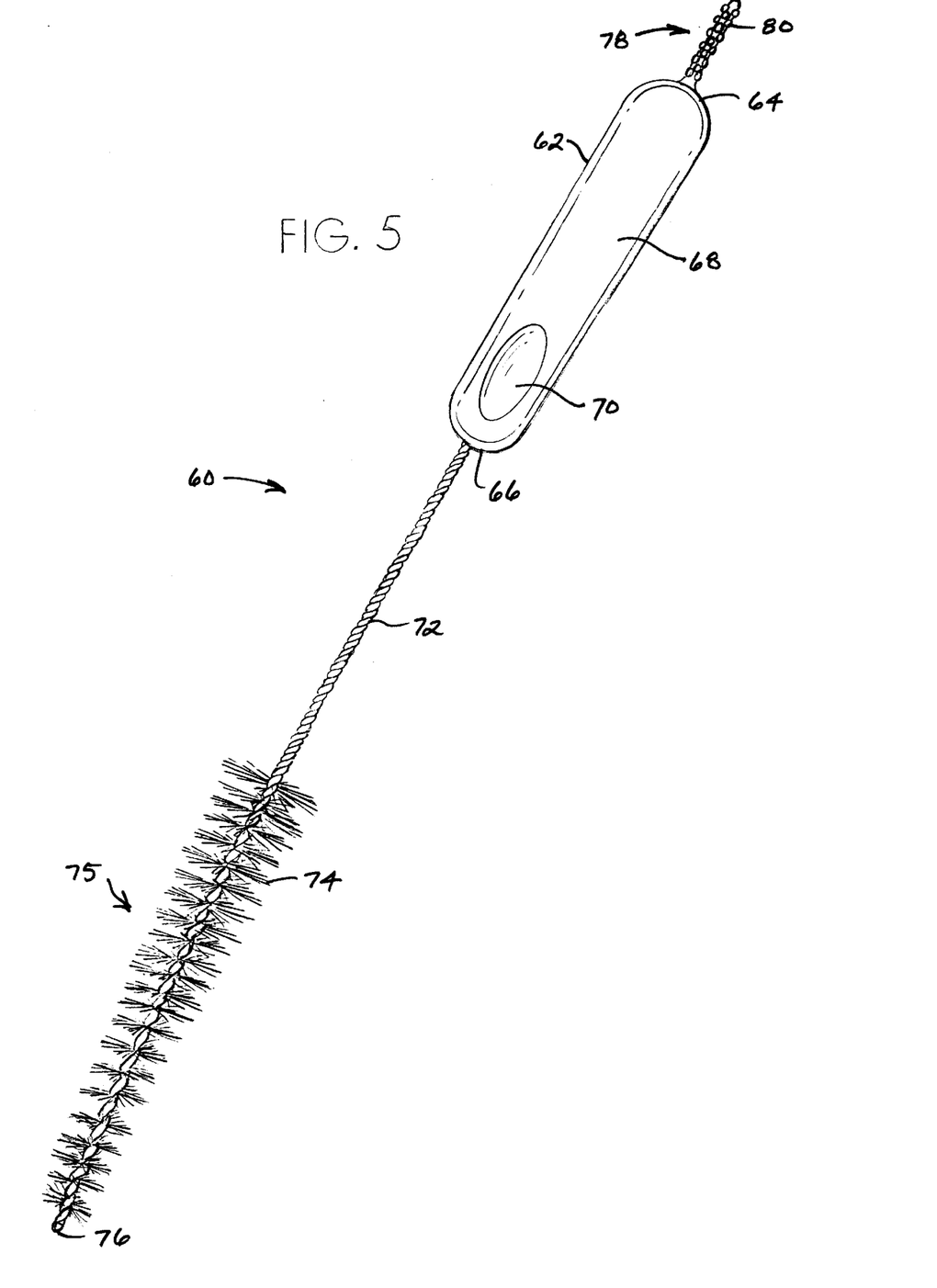
FIG. 5 is a perspective view of a cleaning brush that is useful with the oven baster of FIG. 1.
Figure 6:
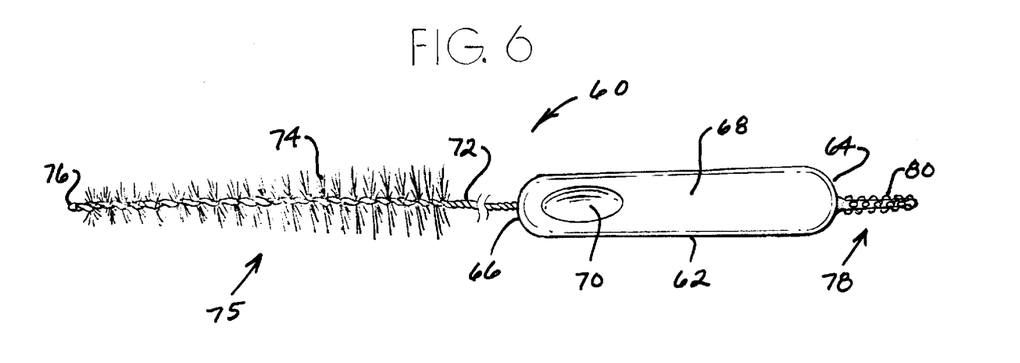
FIG. 6 is a front elevational view of the cleaning brush of FIG. 5.
Figure 7:
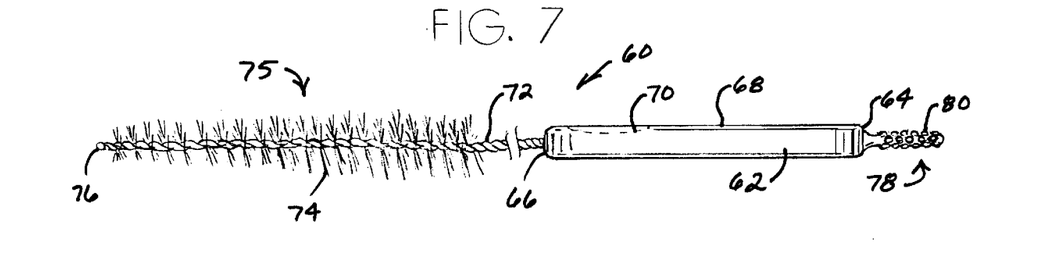
FIG. 7 is a side elevational view of the cleaning brush of FIG. 5.

Referring now to FIGS. 5, 6 and 7, a cleaning brush 60 is illustrated that is particularly useful in combination with baster 10 to facilitate cleaning of baster tube 12. Brush 60 includes a handle 62 having a proximate end 64 and a distal end 66. Handle 62 is of substantially even thickness in one transverse direction, as shown in FIG. 7, and is generally tapered in another transverse direction, as shown in FIGS. 5 and 6. Proximate end 64 is generally rounded, as is distal end 66, and handle 62 tapers from proximate end 64 toward distal end 66. On one broad surface 68 of handle 62, a concave thumb indent 70 is provided to enhance gripping of handle 62 to prevent slippage in the user's hand. Handle 62 is preferably constructed of the same flexible, resilient material of which bulb 14 is constructed, although other materials are contemplated.

Extending from distal end 66 of handle 62 is a longitudinal shank 72 comprising a pair of wires helically twisted about each other. Shank 72 is embedded a sufficient distance within handle 62 to substantially prevent shank 72 from being separated from handle 62 under application of usual forces associated with the use of brush 60 as a cleaning implement. Preferably, shank 72 is embedded as handle 62 is molded thereabout. The wires from which shank 72 is comprised preferably are constructed of steel and coated with a polymeric material such as vinyl to prevent rusting, and also to prevent scratching of tube 12 during use, as described below.

Twisted between the pair of wires of shank 72 and extending generally radially therefrom are a plurality of bristles 74, preferably comprising monofilament nylon. Bristles 74 are disposed along the distal portion 75 of shank 72, from distal tip 76 of shank 72 to about the midway point between distal tip 76 and distal end 66 of handle 62 (See FIG. 5). Distal tip 76, rather than presenting exposed wire ends, is coated with a polymeric material such as vinyl, smoothly contoured, to prevent rusting and especially to prevent the end of shank 72 from scratching tube 12 during use. The material coating distal tip 76 should be less hard than the material of which tube 12 is constructed. Preferably, bristles 74 taper in length toward distal tip 76 at approximately the same taper as that of reservoir portion 16 of tube 12, to facilitate ease of insertion of brush 60 into tube 12, as described below.

Extending from proximal end 64 of handle 62 is an elongate cleaning probe 78 that is integral with and constructed of the same flexible, resilient material as handle 62. Cleaning probe 78 has a length approximately corresponding to the axial length of tip portion 20 of tube 12, and has a maximum outer diameter sufficiently small to permit entry of cleaning probe 78 into tip portion 20 through open end 32. Cleaning probe 78 has a textured surface 80 defined by a plurality of raised nibs. Other coarsely textured surfaces, such as ribbing, are also contemplated. Cleaning probe 78 with textured surface 80 provides a considerable advantage over prior art cleaning brushes by facilitating the removal of food particles or other materials from the interior surface of tip portion 20, as described below. The cleaning effectiveness of probe 78 is enhanced by the flexibility of the material from which it is constructed, which permits the user to manipulate the cleaning probe 78 as needed to dislodge particles adhering within tip portion 20. The textured surface of probe 78 also enhances its cleaning effectiveness.

Figure 8:
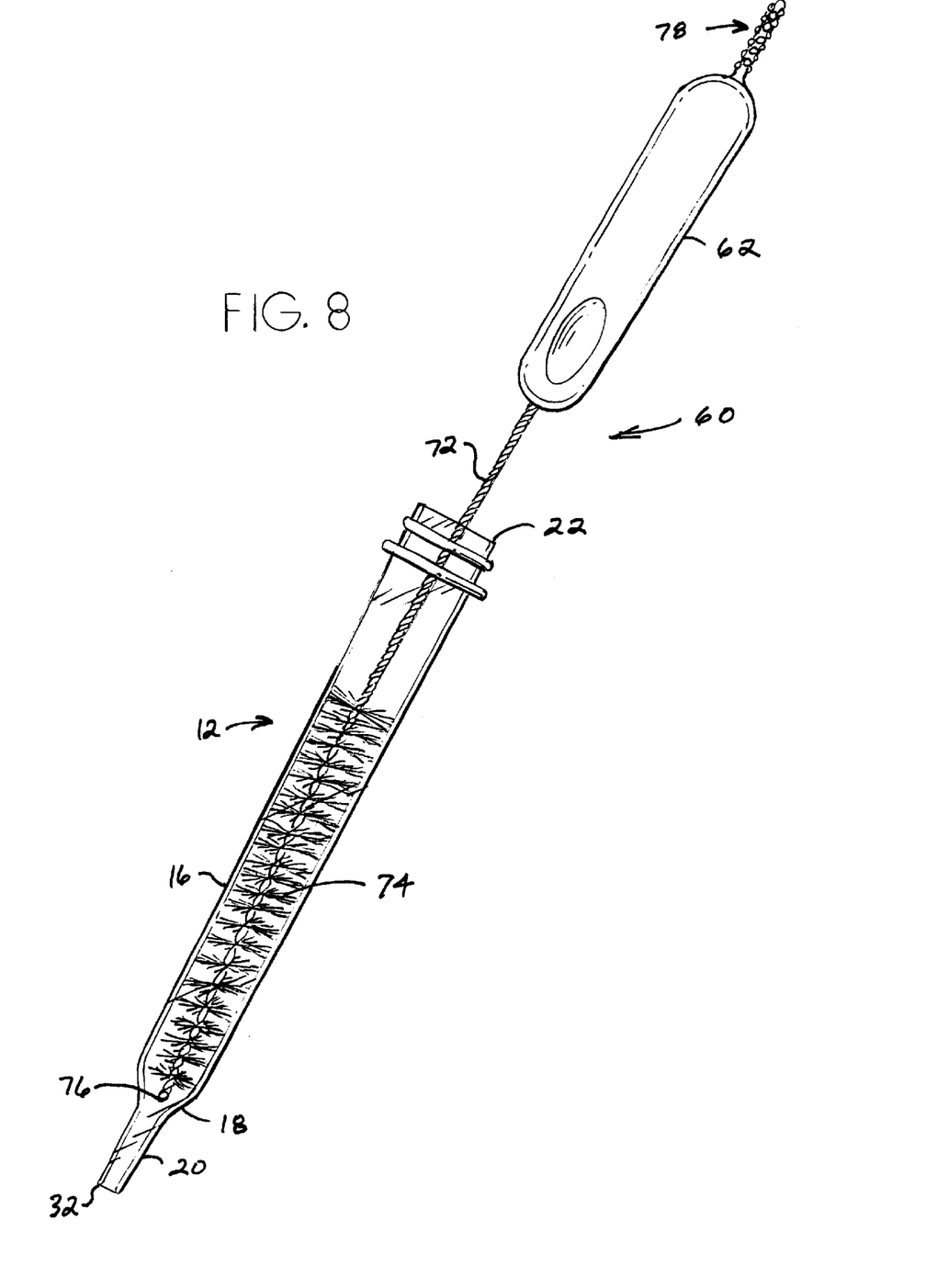
FIG. 8 is a perspective view of the cleaning brush of FIG. 5 received in cleaning engagement in the tube of the oven baster of FIG. 1.

Referring to FIG. 8, the manner of using the bristles 74 of cleaning brush 60 to clean tube 12 is illustrated. With bulb 14 having been previously removed from tube 12, distal tip 76 of brush 60 is inserted within tube 12 through open end 22, preferably in the presence of water and detergent. Brush 60 can be repeatedly inserted into and withdrawn from tube 12 in a reciprocating fashion, or can be rotated within tube 12, as desired, to clean the inner surface of tube 12. Because the taper of bristles 74 corresponds generally to the taper of reservoir portion 16, brush 60 can be readily inserted all the way to and within transition section 18 of tube 12. Because of the great reduction in diameter of tip portion 20 relative to reservoir portion 16, bristles 74 which are dimensioned for reservoir portion 16 cannot easily be inserted within tip portion 20. Therefore, cleaning probe 78 is provided for cleaning tip portion 20, as described further below.

Figure 9:
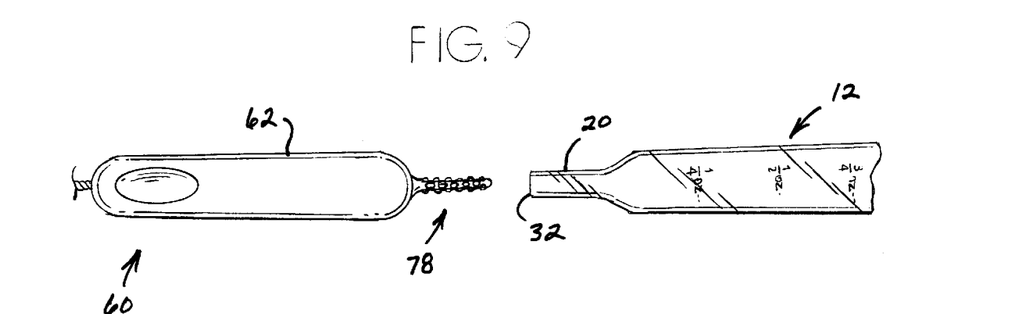
FIG. 9 is a front elevational view of the handle of the cleaning brush of FIG. 5, and a front elevational view of the tube of the oven baster of FIG. 1, the cleaning probe of the handle being aligned with the tip portion of the tube.
Figure 10:
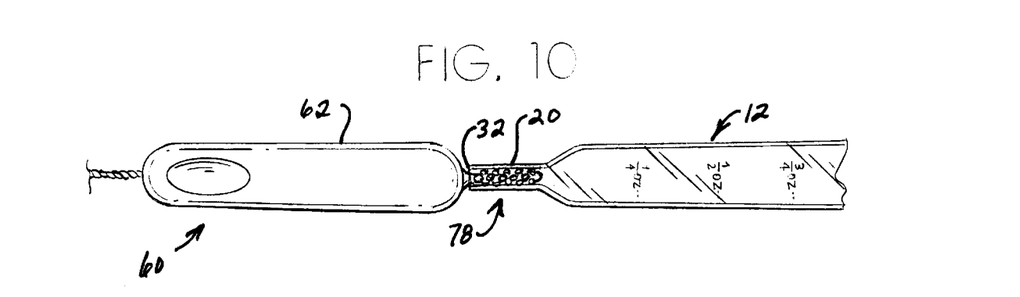
FIG. 10 is a front elevational view of the handle of the cleaning brush of FIG. 5, and a front elevational view of the tube of the oven baster of FIG. 1, the cleaning probe of the handle being received within the tip portion of the tube.

Referring now to FIGS. 9 and 10, the manner of using cleaning probe 78 of cleaning brush 60 is illustrated. As a first step, brush 60 is oriented relative to tube 12 oppositely to the orientation shown in FIG. 8, such that cleaning probe 78 is axially aligned with open end 32 of tip portion 20, as shown in FIG. 9. When so positioned, bristles 74 are disposed entirely externally of tube 12. Next, preferably in the presence of water and detergent, cleaning probe 78 is inserted axially into tip portion 20, as shown in FIG. 10, and can be manipulated in reciprocating or rotating motions as desired and as necessary to dislodge food particles from and clean the inner surface of tip portion 20.

While the present invention has been described in detail in terms of a preferred embodiment, the scope of the invention in which patent rights are claimed is not limited thereto but is defined by the claims appended below:

We claim:

1. A baster comprising:
   a tube having a tip portion and a reservoir portion tapered from the compressible bulb toward the tip portion, the tube being comprised of a substantially transparent polymeric material; and
   a compressible bulb in communication with the reservoir portion of the tube, the bulb being resiliently self-expandable to induce reduced air pressure in the tube relative to ambient air pressure.

2. The baster of claim 1, wherein the polymeric material is acid-resistant.

3. The baster of claim 1, wherein the polymeric material is resistant to heat deformation up to a temperature of at least 100° C.

4. The baster of claim 1, wherein the polymeric material is resistant to heat deformation up to a temperature of about 118° C.

5. The baster of claim 1, wherein the polymeric material is a polycarbonate.

6. The baster of claim 1, the tube further including a transition segment in communication with the tip portion and with the reservoir portion.

7. The baster of claim 1, wherein the tip portion is tapered.

8. The baster of claim 1, wherein the reservoir portion of the tube includes an open end and an annular stop spaced from the open end in engagement with the compressible bulb.

9. The baster of claim 8, wherein the reservoir portion of the tube includes an annular sealing ring disposed intermediate the open end and the annular stop, in engagement with the compressible bulb.

10. The baster of claim 9, wherein the bulb includes an inner annular groove in engagement with the annular sealing ring.

11. A cleaning brush for a tube comprising:
   a handle having a proximate end and a distal end and being of substantially even thickness in one transverse direction and tapering in another transverse direction from the proximate end to the distal end;
   a longitudinal shank extending distally from the distal end of the handle;
   a plurality of bristles extending substantially transversely from the shank; and
   an elongate flexibly resilient cleaning probe extending distally from the distal end of the handle.

12. The cleaning brush of claim 11, wherein the elongate cleaning probe has a textured surface suitable for dislodging particles adhered to an interior surface of the tube.

13. The cleaning brush of claim 12, wherein the textured surface includes a plurality of raised nibs.

14. The cleaning brush of claim 11, wherein the shank is comprised of at least two wires spirally twisted about each other along a longitudinal axis of the shank.

15. The cleaning brush of claim 14, wherein the shank has a distal tip that is smoothly contoured to alleviate scratching the tube.

16. The cleaning brush of claim 14, wherein the wires of the shank are coated with a polymeric material.

17. A baster and cleaning brush set comprising:
   a baster including:
      a tube having a reservoir portion and a tip portion; and
      a compressible bulb in communication with the reservoir portion of the tube, the bulb being resiliently self-expandable to induce reduced air pressure in the tube relative to ambient air pressure; and a cleaning brush for the tube including:
- a handle having a proximate end and a distal end;
- a longitudinal shank extending distally from the distal end of the handle;
- a plurality of bristles extending substantially transversely from the shank; and
- an elongate cleaning probe extending distally from the distal end of the handle.

18. The baster and cleaning brush set of claim 17, wherein the elongate cleaning probe is resiliently flexible.

19. The baster and cleaning brush set of claim 18, wherein the elongate cleaning probe has a textured surface suitable for dislodging particles adhered to an interior surface of the tube.

20. The baster and cleaning brush set of claim 17, wherein the shank is comprised of at least two wires spirally twisted about each other along a longitudinal axis of the shank.

21. The cleaning brush of claim 20, wherein the shank has a distal tip that is smoothly contoured to alleviate scratching the tube.

* * * * *

UNITED STATES PATENT AND TRADEMARK OFFICE
CERTIFICATE OF CORRECTION

PATENT NO. : 6,354,337 B1
DATED : March 23, 2002
INVENTOR(S) : Bruce Odessky et al.

It is certified that error appears in the above-identified patent and that said Letters Patent is hereby corrected as shown below:

Column 1,
Line 40, replace "diameter tip portion of the basting tube" with -- diameter tip portion of the basting tube --.

Column 2,
Lines 4 and 17, replace "elongate cleaning probe extends distally from the distal end" with -- elongate cleaning proble extends proximally from the proximate end --.

Column 6,
Line 46, replace "distally" with -- proximally --.
Line 46, replace "distal" with -- proximate --.

Column 7,
Line 8, replace "distally" with -- proximally --.
Line 9, replace "distal" with -- proximate --.

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,354,337 B1
DATED : March 12, 2002
INVENTOR(S) : Bruce Odessky et al.

It is certified that error appears in the above-identified patent and that said Letters Patent is hereby corrected as shown below:

Column 2,
Lines 4 and 17, replace "proble" with -- probe --

Signed and Sealed this

Twenty-eighth Day of June, 2005

JON W. DUDAS
*Director of the United States Patent and Trademark Office*